(12) United States Patent
Norimatsu

(10) Patent No.: US 8,147,146 B2
(45) Date of Patent: Apr. 3, 2012

(54) WHEEL BEARING DEVICE WITH ROTATION SENSOR

(75) Inventor: Takayuki Norimatsu, Iwata (JP)

(73) Assignee: NTN Corporation, Osaka (JP)

( * ) Notice: Subject to any disclaimer, the term of this patent is extended or adjusted under 35 U.S.C. 154(b) by 284 days.

(21) Appl. No.: 12/532,464

(22) PCT Filed: Mar. 18, 2008

(86) PCT No.: PCT/JP2008/054965
§ 371 (c)(1),
(2), (4) Date: Sep. 22, 2009

(87) PCT Pub. No.: WO2008/123065
PCT Pub. Date: Oct. 16, 2008

(65) Prior Publication Data
US 2010/0104231 A1 Apr. 29, 2010

(30) Foreign Application Priority Data
Mar. 26, 2007 (JP) .................................. 2007-078092

(51) Int. Cl.
*F16C 19/08* (2006.01)
*F16C 41/04* (2006.01)
*F16C 32/04* (2006.01)

(52) U.S. Cl. ... 384/448; 384/446; 384/544; 324/207.22; 324/219

(58) Field of Classification Search .................. 384/448, 384/543–544, 548, 586, 446; 324/173–174, 324/207.22–207.25, 219; 301/105.1; 303/168
See application file for complete search history.

(56) References Cited

U.S. PATENT DOCUMENTS

| 5,567,058 | A | 10/1996 | Morita et al. |
| 5,594,334 | A | 1/1997 | Sonnerat et al. |
| 6,956,367 | B2 * | 10/2005 | Fujikawa et al. ........ 324/207.25 |
| 7,255,014 | B2 * | 8/2007 | Suzuki ..................... 73/862.321 |
| 7,341,321 | B2 * | 3/2008 | Takahashi et al. ............ 303/168 |
| 7,618,194 | B2 * | 11/2009 | Ohtsuki et al. ................ 384/544 |
| 2007/0253653 | A1 * | 11/2007 | Shigeoka et al. ............. 384/448 |
| 2007/0278851 | A1 * | 12/2007 | Nakamura et al. ......... 301/105.1 |

FOREIGN PATENT DOCUMENTS

| JP | 8-043411 | 2/1996 |
| JP | 2000-065847 | 3/2000 |
| JP | 2001-289867 | 10/2001 |
| JP | 3231185 | 11/2001 |
| JP | 2006-112919 | 4/2006 |
| JP | 2006266729 A * | 10/2006 |

OTHER PUBLICATIONS

International Search Report issued Jun. 17, 2008 in International (PCT) Application No. PCT/JP2008/054965.

* cited by examiner

*Primary Examiner* — Marcus Charles
(74) *Attorney, Agent, or Firm* — Wenderoth, Lind & Ponack, L.L.P.

(57) ABSTRACT

An output cable 16c of a magnetic sensor 16a, which extends outward in the tangential direction of an arcuate sensor holding portion 15a formed on an annular core member 15 from a sensor unit mounted in the sensor holding portion 15a, is fixedly molded in a mold resin 17b which is fixed in a through hole 15c formed in the sensor holding portion 15a near the sensor unit 16. As a result, the output cable 16c is prevented, even if tensed, from coming out of the sensor unit 16.

2 Claims, 4 Drawing Sheets

WHEEL BEARING DEVICE WITH ROTATION SENSOR

TECHNICAL FIELD

This invention relates to a wheel bearing device with a rotation sensor for detecting rotation of a wheel.

BACKGROUND ART

Wheel bearing devices comprising an outer member having raceways in double rows on its radially inner surface and fixed to a vehicle body, an inner member having raceways in double rows opposing to the respective raceways of the outer member on its radially outer surface and fixed to a wheel, and rolling elements disposed between the raceways of the inner and outer members include a wheel bearing device with a rotation sensor mounted on the inboard side to detect rotation of the wheel to control devices such as an ABS (Antilock Brake System). This rotation sensor basically consists of a magnetic encoder magnetized such that different magnetic poles are alternately arranged in the circumferential direction and mounted on the inner member, which is a rotating race, and a magnetic sensor mounted on the outer member, which is a fixed race, for detecting change of flux as the magnetic encoder rotates.

Such wheel bearings with a rotation sensor include one wherein an arcuate sensor holding portion is formed with its radially inner end protruding toward the inboard side and bent radially inward, on an annular metallic core member fit around the inboard end of the outer member. A sensor unit incorporated with a magnetic sensor is mounted on the sensor holding portion so as to protrude toward the inboard side from the core member. An output cable extends outward from the circumferential end face of the sensor unit in the tangential direction of the arcuate sensor holding portion so as to take the output detected by the magnetic sensor with the output cable through a narrow space on the inboard side (e.g. Patent Document 1).

In the device described in Patent Document 1, the magnetic encoder on the inner member is mounted on the outer face of an annular portion of a slinger mounted on the inboard side of the inner member to seal the bearing space, and the magnetic sensor is mounted in the sensor unit so as to axially oppose to the magnetic encoder. In many cases, a circuit board for processing the output detected by the magnetic sensor is mounted together in the sensor unit. In this case, the output cable is connected to the magnetic sensor through the circuit board. Materials such as hall element, hall IC and MR element are used for the magnetic sensor.
Patent Document 1: Japanese Patent No. 3231185

SUMMARY OF THE INVENTION

Object of the Invention

In the wheel bearing device with a rotation sensor described in Patent Document 1, when the rotation sensor is mounted on the bearing or when the bearing mounted with the rotation sensor is assembled to a vehicle body, the output cable may come out of the sensor unit if the cable is hung up on some object and tensed. Also, in cold districts, when steering the vehicle while inside the tire house is frozen, the output cable may be pulled and come out.

The object of this invention is to prevent the output cable of the magnetic sensor from coming out of the sensor unit even if the output cable is tensed.

Means to Achieve the Object

To achieve the above-mentioned object, this invention adopt a configuration of a wheel bearing device with a rotation sensor comprising an outer member having raceways in double rows on its radially inner surface and fixed to a vehicle body, the raceways being provided on the inboard side and the outboard side respectively, an inner member having raceways in double rows on its radially outer surface and fixed to a wheel, the raceways of the inner member opposing to the raceways of the outer member on the inboard and outboard sides of the inner member respectively, and rolling elements provided between the raceways on the inner and outer members, wherein a magnetic encoder magnetized such that different magnetic poles are alternately arranged in the circumferential direction is attached on the inboard end of the inner member, wherein an annular core member is fit around the inboard side edge of the outer member, and has an arcuate sensor holding portion protruding toward the inboard side from its radially inner end and bent radially inward, wherein a sensor unit containing a magnetic sensor for detecting change of flux when the magnetic encoder rotates is mounted on the sensor holding portion so as to protrude toward the inboard side from the core member, and wherein an output cable for transmitting the output of the magnetic sensor extends outward from the circumferential end face of the sensor unit in the tangential direction of the sensor holding portion, characterized in that a means to fix the output cable to the sensor holding portion near the sensor unit is provided.

That is, by providing the means to fix the output cable extending outward from the sensor unit in the tangential direction of the sensor holding portion to the sensor holding portion near the sensor unit, the output cable of the magnetic sensor is prevented from coming off the sensor unit even if the output cable is tensed.

This means may comprise a through hole formed in the sensor holding portion, and a mold resin fixed in position in the through hole, wherein the output cable is mold-fixed in the mold resin. With this arrangement, the output cable can be easily and firmly fixed.

Effect of The Invention

In the wheel bearing device with a rotation sensor according to the present invention, by providing a means to fix the output cable extending outward from the sensor unit in the tangential direction of the sensor holding portion to the sensor holding portion near the sensor unit, the output cable of the magnetic sensor is prevented from coming off the sensor unit even if the output cable is tensed.

By providing the through hole formed in the sensor holding portion, and the mold resin fixed in position in the through hole, wherein the output cable is mold-fixed in the mold resin, the output cable can be easily and firmly fixed.

Figure 1:
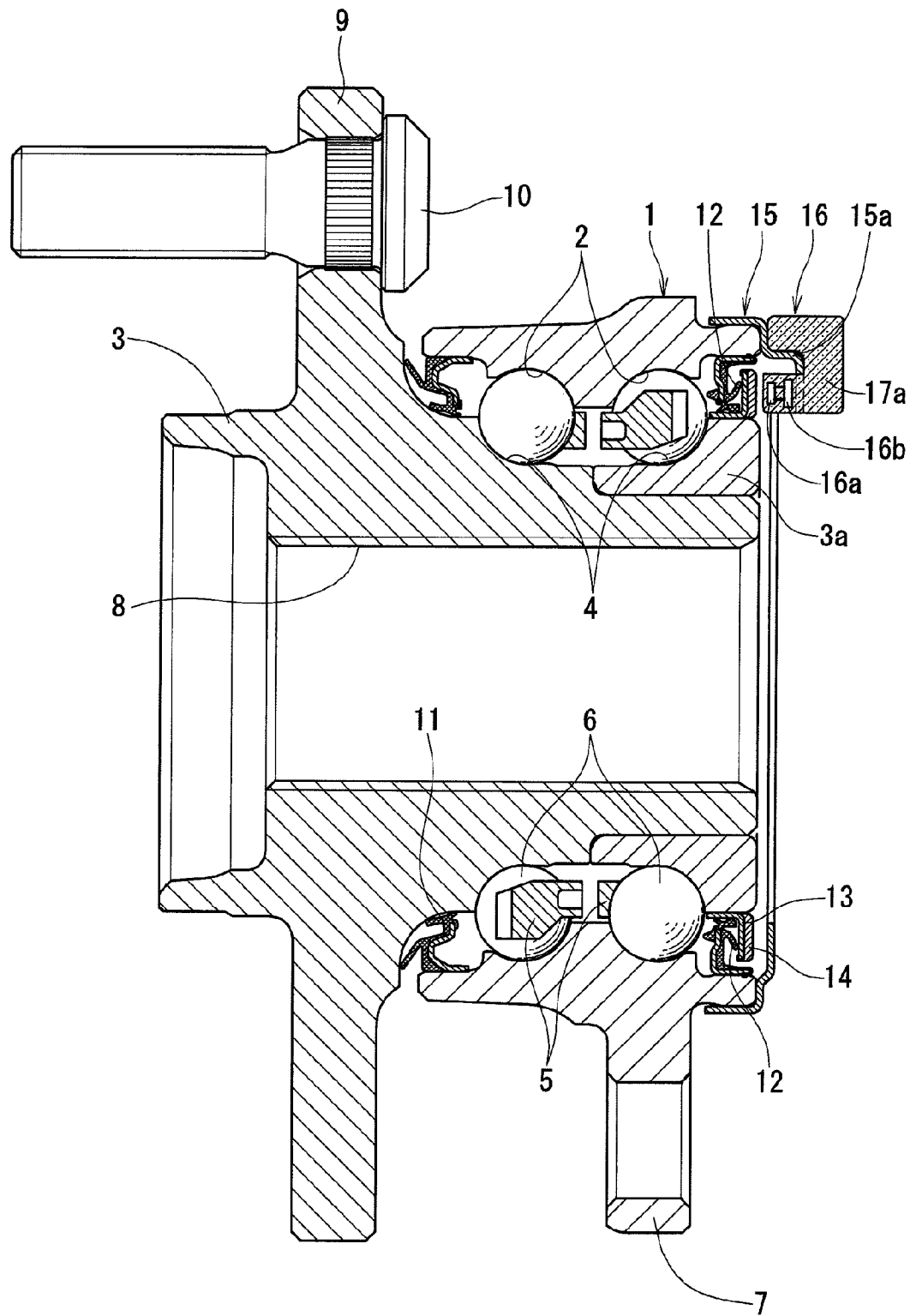
FIG. 1 is a vertical sectional view of the embodiment of the wheel bearing device with a rotation sensor.

DESCRIPTION OF THE NUMERALS 1 outer member
2 raceway 3 inner member
3a inner ring
4 raceway
5 retainer
6 ball
7 flange
8 axle hole
9 flange
10 hub bolt
11, 12 seal member
13 slinger
14 magnetic encoder
15 core member
15a sensor holding portion
15b cutout
15c through hole
16 sensor unit
16a magnetic sensor
16b circuit board
16c output cable
17a, 17b mold resin

DETAILED DESCRIPTION OF THE INVENTION

Figure 2:
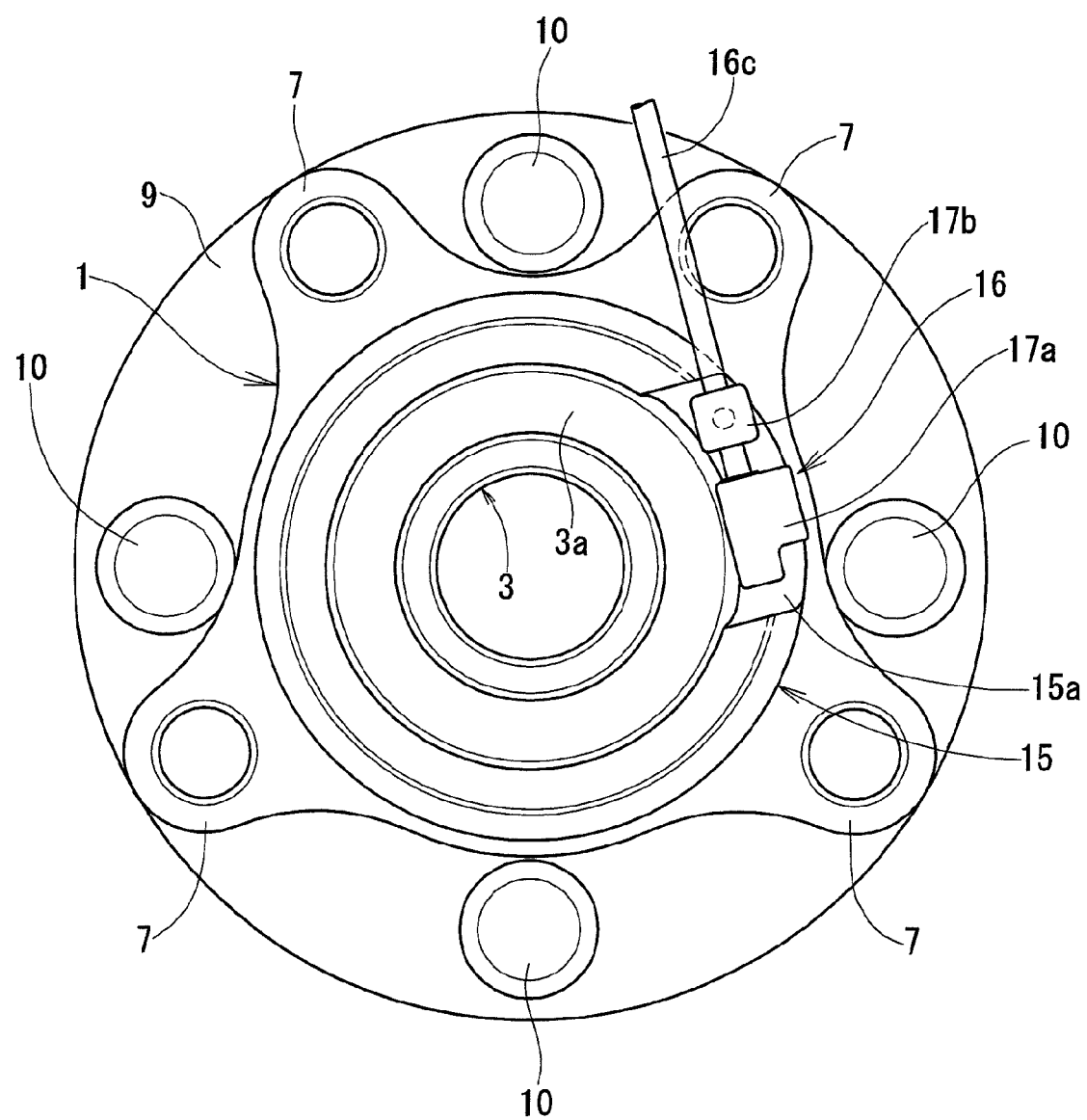
FIG. 2 is a side view of FIG. 1 from the inboard side.

With reference to the drawings, embodiment of the present invention is described below. As shown in FIGS. 1 and 2, this wheel bearing with a rotation sensor comprises an outer member 1 having raceways 2 in double rows on its radially inner surface, an inner member 3 having raceways 4 in double rows on its radially outer surface and opposing to the respective raceways 2 of the outer member 1, and balls 6 or rolling elements provided between the raceways 2 and 4 on the inner and outer members 3 and 1 and retained by a retainer 5. The outer member 1 is a fixed race attached to a vehicle body through a flange 7, and the inner member 3 is a rotating race attached to an axle through an axle hole 8 formed in the inner member 3. A wheel is attached to a flange 9 provided on the inner member 3 with hub bolts 10. The raceway 4 on the inboard side of the inner member 3 is provided on a separate inner ring 3a that is fit on the radially outer face of the inner member 3.

The outboard side of the bearing space between the outer and inner members 1 and 3 is sealed with a seal member 11 fit on the outer member 1. The inboard side of the bearing space is sealed with a seal member 12 and a slinger 13 fit on the inner ring 3a on the inner member 3. On the outer face of the annular portion of this slinger 13, a magnetic encoder 14 formed with a rubber magnet magnetized such that different magnetic poles are alternately arranged in the circumferential direction is attached with vulcanized bonding.

An annular metallic core member 15 is fit around the inboard side edge of the outer member 1. The core member 15 has an arcuate sensor holding portion 15a protruding toward the inboard side from its radially inner end and bent radially inward. On the sensor holding portion 15a, a sensor unit 16 containing a magnetic sensor 16a axially opposed to the magnetic encoder 14 for detecting change of flux when the encoder rotates, and a circuit board 16b for processing the output of the magnetic sensor 16a is provided so as to protrude toward the inboard side from the core member 15. From the circumferential end face of this sensor unit 16, an output cable 16c for transmitting the output of the magnetic sensor 16a extends outward in the tangential direction of the sensor holding portion 15a.

Figure 3:
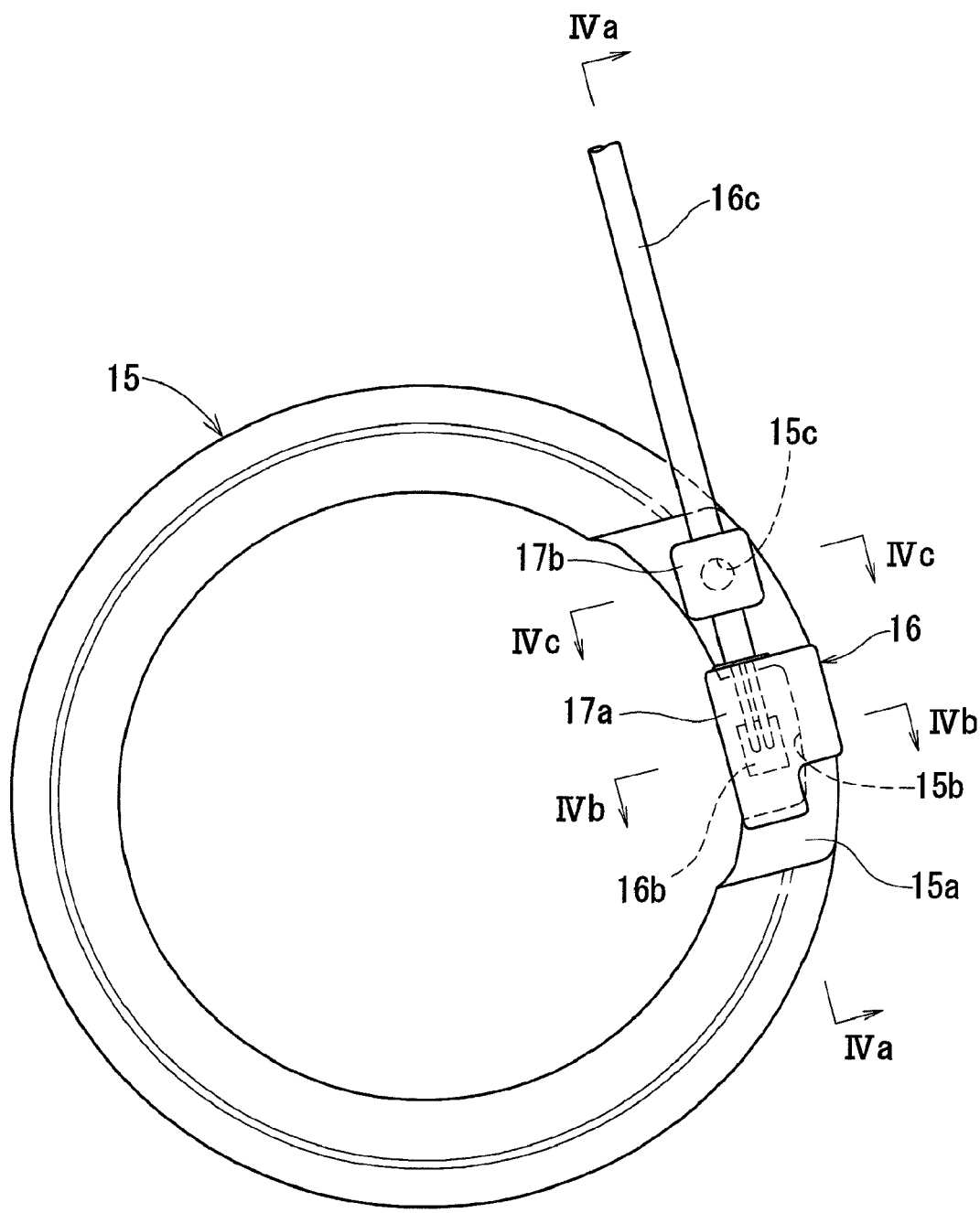
FIG. 3 is a side view of the core member of mounted with the sensor unit of FIG. 2.
Figure 4A:
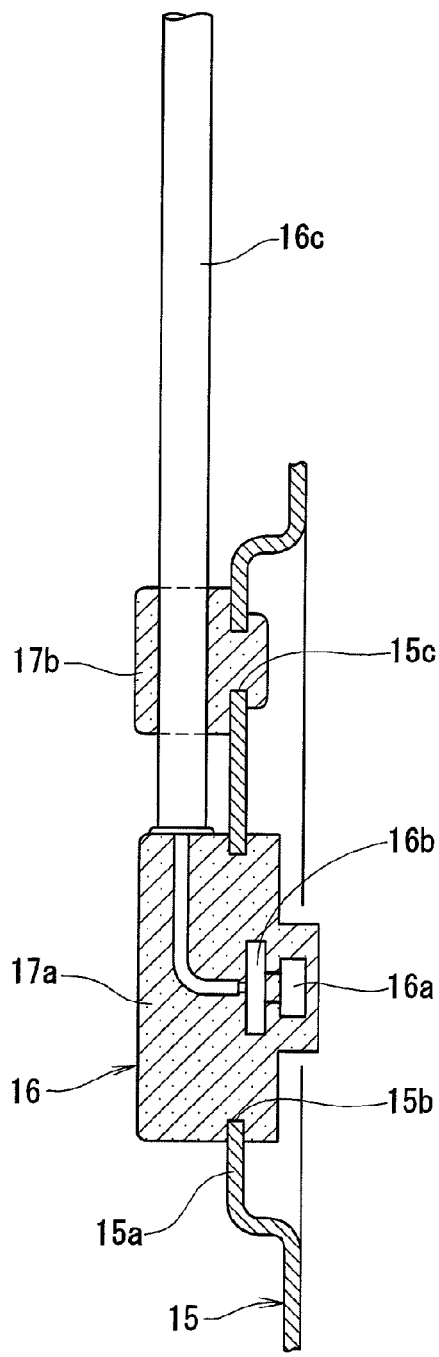
FIGS. 4(a), 4(b) and 4(c) are sectional views taken along the lines IVa-IVa, IVb-IVb and IVc-IVc of FIG. 3, respectively.
Figure 4B:
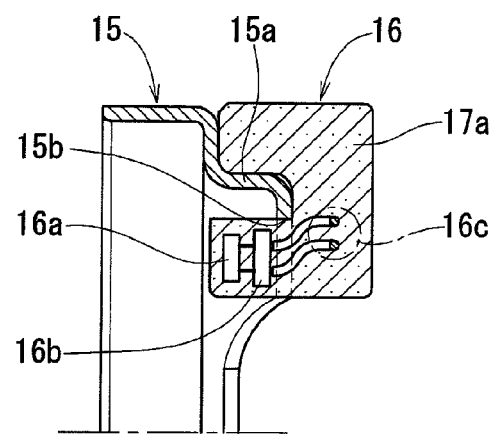

As shown in FIGS. 3, 4(a) and 4(b), a cutout 15b is provided on the radially inner side of the sensor holding portion 15a of the core member 15. The sensor unit 16 is formed with a mold resin 17a fixed in this cutout 15b, with the magnetic sensor 16a and the circuit board 16b embedded in the mold resin 17a and with the output cable 16c connected to the circuit board 16b.

Figure 4C:
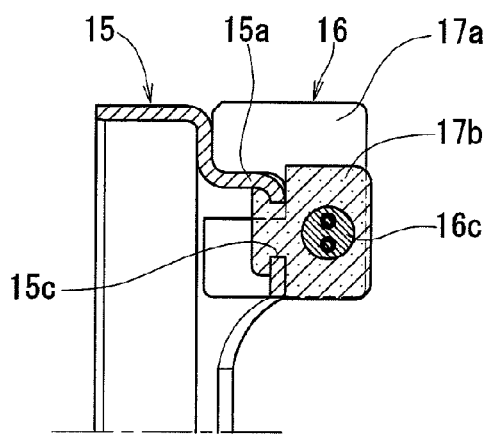

Also, as shown in FIGS. 3, 4(a) and 4(c), a through hole 15c is formed in the sensor holding portion 15a of the core member 15 near the cutout 15b. In a mold resin 17b fixed in this through hole 15c, the output cable 16c extending outward from the circumferential end face of the sensor unit 16 is mold-fixed. Thus the output cable 16c does not come out of the sensor unit 16 even if tensed.

In the embodiment described above, the rolling elements provided in double rows between the outer and inner members are balls. But these rolling elements may be tapered rollers.

What is claimed is:

1. A wheel bearing device with a rotation sensor, comprising:
    an outer member having raceways in double rows on a radially inner surface of the outer member, wherein the outer member is to be fixed to a vehicle body, the raceways being provided on an inboard side and an outboard side of the outer member, respectively;
    an inner member having raceways in double rows on a radially outer surface of the inner member, wherein the inner member is to be fixed to a wheel, the raceways of the inner member being provided on inboard and outboard sides of the inner member, respectively, so as to oppose the raceways of the outer member;
    rolling elements provided between the raceways of the inner and outer members;
    a magnetic encoder attached on an inboard end of the inner member, the magnetic encoder being magnetized such that different magnetic poles are alternately arranged in a circumferential direction;
    an annular core member fitted around an inboard side edge of the outer member, the annular core member having an arcuate sensor holding portion protruding toward the inboard side from a radially inner end of the annular core member, the arcuate sensor holding portion being bent radially inwardly;
    a sensor unit mounted on the arcuate sensor holding portion so as to protrude toward the inboard side from the annular core member, the sensor unit containing a magnetic sensor for detecting change of flux when the magnetic encoder rotates; and
    an output cable for transmitting an output of the magnetic sensor, the output cable being arranged so as to extend outwardly from a circumferential end face of the sensor unit in a tangential direction of the arcuate sensor holding portion,
    wherein a through hole is formed in the arcuate sensor holding portion near the sensor unit, a mold resin is fixed in position in the through hole, and an intermediate portion of the output cable is mold-fixed in the mold resin so as to fix the output cable to the arcuate sensor holding portion.

2. The wheel bearing device with a rotation sensor according to claim 1, wherein the mold resin comprises a first mold resin, and wherein the sensor unit is mounted on the arcuate sensor holding portion by a second mold resin, the first and second mold resins being spaced apart from each other.

* * * * *